United States Patent
Law et al.

(10) Patent No.: US 11,537,088 B2
(45) Date of Patent: Dec. 27, 2022

(54) METHODS AND APPARATUS TO IMPLEMENT SAFETY APPLICATIONS ASSOCIATED WITH PROCESS CONTROL SYSTEMS

(71) Applicant: Fisher-Rosemount Systems, Inc., Round Rock, TX (US)

(72) Inventors: Gary K. Law, Georgetown, TX (US); Godfrey Sherriff, Austin, TX (US); Sergio Diaz, Pflugerville, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 632 days.

(21) Appl. No.: 16/575,020

(22) Filed: Sep. 18, 2019

(65) Prior Publication Data

US 2021/0080913 A1    Mar. 18, 2021

(51) Int. Cl.
*G05B 9/03* (2006.01)
*G06F 11/07* (2006.01)
*G05B 19/418* (2006.01)

(52) U.S. Cl.
CPC ......... *G05B 9/03* (2013.01); *G05B 19/41845* (2013.01); *G06F 11/0796* (2013.01)

(58) Field of Classification Search
CPC ............ G05B 2219/34456; G05B 9/03; G05B 19/41845; G05B 19/0426; G05B 9/02;
(Continued)

(56) References Cited

U.S. PATENT DOCUMENTS 4,870,531 A    9/1989   Danek
2014/0100670 A1*  4/2014  Gosh ................... G06F 9/5088
                                                         700/20
(Continued)

FOREIGN PATENT DOCUMENTS

WO     2005043712     5/2005

OTHER PUBLICATIONS

Intellectual Property Office, "Search Report Under Section 17(5)," issued in connection with British Patent application No. GB2013795. 6, dated Apr. 16, 2021, 4 pages.
(Continued)

*Primary Examiner* — Christopher E. Everett
(74) *Attorney, Agent, or Firm* — Hanley, Flight & Zimmerman, LLC

(57) ABSTRACT

Methods and apparatus to implement safety applications associated with process control systems are disclosed. An apparatus includes a configuration controller to: provide a plurality of available safety applications for implementation by a safety trip device to a user for selection, a first one of the safety applications associated with a first set of I/O signals, a second one of the safety applications associated with a second set of I/O signals, the first safety application implemented based on first pre-programmed instructions stored in memory of the safety trip device, the second safety application implemented based on second pre-programmed instructions stored in the memory; and, in response to a user selection of the first safety application, prompt the user to specify values for configuration settings associated with the first safety application. The apparatus also includes an I/O analyzer to implement the first safety application.

21 Claims, 5 Drawing Sheets

(58) Field of Classification Search
CPC ........ G05B 2219/33273; G05B 19/042; G05B 19/418; G06F 21/57; G06F 11/0796; H02H 3/006; Y02P 90/02
See application file for complete search history.

(56) References Cited

U.S. PATENT DOCUMENTS

| | | | |
|---|---|---|---|
| 2015/0186118 A1* | 7/2015 | Prosak | G05B 19/056 |
| | | | 717/109 |
| 2016/0259313 A1* | 9/2016 | Liu | G06F 8/34 |
| 2016/0291566 A1* | 10/2016 | Prosak | G05B 19/058 |
| 2018/0266626 A1 | 9/2018 | Machuletz et al. | |

OTHER PUBLICATIONS

Tan et al., "Power Socket Programmable Circuit Breaker System," IEEE 2008 IEEE 2nd International Power and Energy Conference (PECon)—Johor Bahru, Malaysia (Dec. 1-Dec. 3, 2008), 4 pages.

SIS-TECH, "Diamond SIS" retrieved from http://sis-tech.com/applications/diamond-sis/ on Aug. 30, 2019, 4 pages.

HIMA, "HiMatrix," Product Catalog, retrieved from https://www.hima.com/index.php?eID=dumpFile&t=f&f=9275&token=27af14d3241355b198757c5633d5b0265c59155c on Aug. 30, 2019, 80 pages.

Pepperl & Fuchs, "Trip Amplifiers" retrieved from https://www.pepperl-fuchs.com/global/en/classid_1826.htm on Aug. 30, 2019, 7 pages.

Moore Industries, "SIL 2 and SIL 3 Capable Programmable Current/Voltage and RTD/Thermocouple Safety Trip Alarms," Datasheet, Feb. 2017, 8 pages.

* cited by examiner

METHODS AND APPARATUS TO IMPLEMENT SAFETY APPLICATIONS ASSOCIATED WITH PROCESS CONTROL SYSTEMS

FIELD OF THE DISCLOSURE

This disclosure relates generally to safety instrumented systems, and, more particularly, to methods and apparatus to implement safety applications associated with process control systems.

BACKGROUND

Many process control applications (e.g., distributed control systems (DCSs), supervisory control and data acquisition (SCADA) systems, etc.) include equipment to trigger safety trips in the event that one or more monitored parameter values are outside the bounds of corresponding trip limits and/or some other safety condition is satisfied. Such safety trips may be implemented using different types of equipment depending on the input/output (I/O) count for the safety system and/or the associated complexity of the system. For example, in sophisticated implementations, a safety logic solver may be configured to handle a variable number of I/O points (which may number in the thousands) of different types and which can be processed in a fully configurable (e.g., programmable) manner. At the other end of the spectrum, relatively simple devices, commonly referred to as trip amplifiers or safety relays, typically receive a single input signal and compare it to a limit to trip an output signal (typically a discrete output).

SUMMARY

Methods and apparatus for to implement safety applications associated with process control systems are disclosed. An example apparatus including: a configuration controller to: provide a plurality of available safety applications for implementation by a safety trip device associated with a process control system to a user for selection, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device; and in response to a user selection of the first safety application, prompt the user to specify values for configuration settings associated with the first safety application, the first pre-programmed instructions defining the configuration settings; and an I/O analyzer to implement the first safety application based on the values for the configuration settings specified by the user and based on the first pre-programmed instructions.

A non-transitory computer readable medium including example instructions that, when executed, cause a safety trip device to at least: provide a plurality of available safety applications for implementation by the safety trip device associated with a process control system to a user for selection, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device; in response to a user selection of the first safety application, prompt the user to specify values for configuration settings associated with the first safety application, the first pre-programmed instructions defining the configuration settings; and implement the first safety application based on the values for the configuration settings specified by the user and based on the first pre-programmed instructions.

An example method includes: providing a plurality of available safety applications for implementation by a safety trip device associated with a process control system to a user for selection, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device; in response to a user selection of the first safety application, prompting the user to specify values for configuration settings associated with the first safety application, the first pre-programmed instructions defining the configuration settings; and implementing the first safety application based on the values for the configuration settings specified by the user and based on the first pre-programmed instructions.

A safety trip device includes: a housing including a backplane; terminal blocks including respective slots, the slots to receive a first set of termination modules to communicate with a first set of field devices associated with a first safety application associated with a process control system, the slots to receive a second set of termination modules to communicate with a second set of field devices associated with a second safety application associated with the process control system; and an I/O scanner to communicate with the termination modules in the slots of the terminal blocks via the backplane, the I/O scanner including memory to store first pre-programmed instructions defining operation of the first safety application and to store second pre-programmed instructions defining operation of the second safety application.

Figure 1:
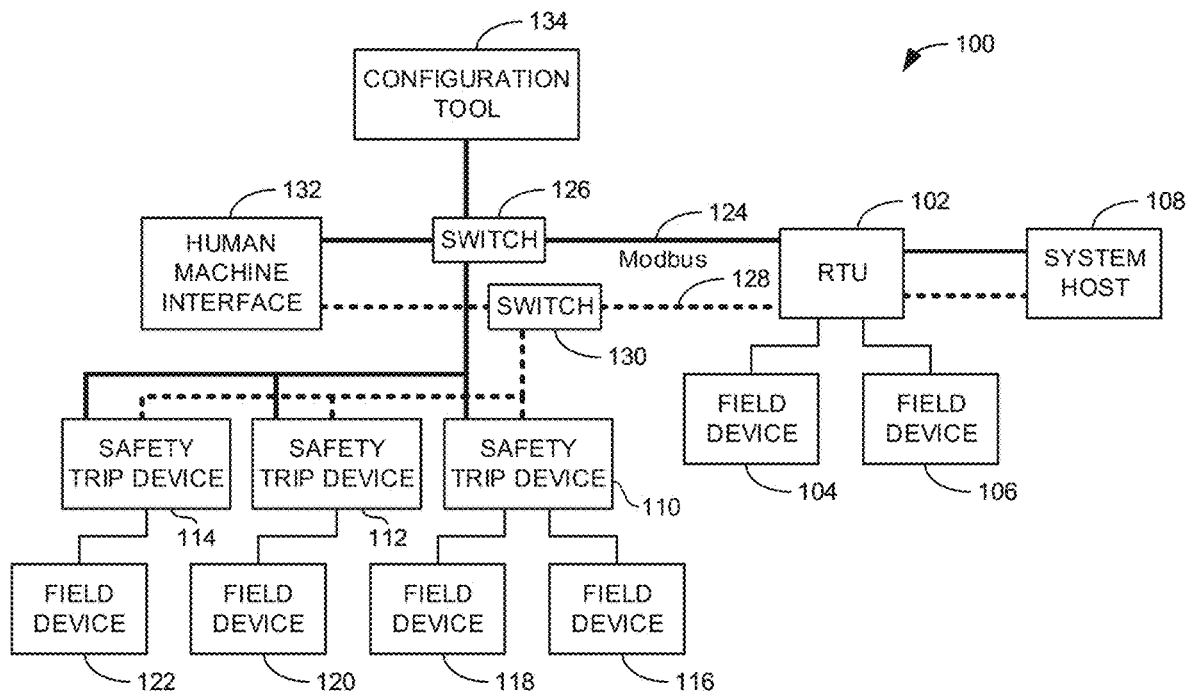
FIG. 1 illustrates an example process control system within which teachings of this disclosure may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The equipment used to implement safety applications associated with process control systems can vary from very sophisticated logic solvers that can handle large numbers of I/O signals in a flexible manner down to single-purpose safety relays that monitor one input of a particular type and generate one output. While sophisticated safety devices (e.g., logic solvers) provide high flexibility for many different applications in a fully configurable manner, such devices are relatively expensive and difficult to implement due to the complexities involved in programming and/or configuring the safety application(s) to be implemented. Not only can the complexities in the programming and/or configuration of safety applications result in the potential for human error, the flexible nature of a fully programmable system also gives rise to the possibility of a safety application being tampered with after it has been configured correctly (either inadvertently or maliciously (e.g., via a cyberattack)).

By contrast, low complexity safety trip devices (e.g., safety relays) have the advantage of being relatively inexpensive and easy to setup due to having a limited, fixed functionality. Furthermore, the limited functionality reduces the likelihood of human error occurring in the configuration of such devices and also prevents the implementation of such devices from being tampered with through cyberattacks. The simple design and function of safety relays is such that their operation is highly reliable. However, many safety relays do not provide redundancy such that, if there is a failure in the system, there is no built in backup to respond to the problem. Furthermore, many safety relays are stand-alone devices that do not allow for communications to other supervisory systems (e.g., wellhead applications where a trip needs to be relayed to a master station).

Some safety applications may involve several different I/O signals (e.g., applications based on voter logic). In some such situations, several different safety relays may be hardwired together to provide the desired functionality associated with the application. While this increases the complexity relative to using a single safety trip device, this may still be sufficiently less complex than having to obtain, set up, and maintain a sophisticated, fully programmable logic solver. Furthermore, when the I/O count of such safety applications remains relatively small (e.g., less than 25), the simplicity of such applications may not justify the cost of a fully programmable logic solver. For some safety applications involving multiple but relatively small numbers of I/O signals, dedicated safety trip devices have been developed to avoid the need to hardwire multiple single-input safety relays. These dedicated safety trip devices typically have a fixed number of I/O of a predefined type corresponding to a particular safety application. While such devices provide convenience in setting up and configuring the system, they are typically rigid or limited in their operation and functionality based on the particular application for which they were developed. As a result, such devices cannot be easily adapted to new circumstances and/or different types of safety applications (e.g., associated with different types of I/O signals) beyond the limited constraints defined by their design and manufacture. Further, as with many safety relays, such dedicated safety trip devices often do not provide redundancy.

Example safety trip devices disclosed herein may be adapted to different types of safety applications associated with different types and/or different numbers of I/O signals without the need for the end user to spend the time and expense of programming the device for each different safety application. Rather, in some examples, machine readable instructions (e.g., software and/or firmware) to implement pertinent safety applications are pre-installed and/or pre-programmed and made available for the user to select for implementation on an example safety trip device. As used herein, the term "pre-programmed" is expressly defined to mean programmed by someone other than an end user before the end user employs the example safety trip device for a corresponding safety application. In some examples, the machine readable instructions associated with particular safety applications are pre-programmed by a manufacturer of the example safety trip device and installed at the time of manufacture. Further, in some examples, pre-programmed instructions for particular safety applications may be developed by third party entities (e.g., an original equipment manufacturer (OEM)) for installation at the time of manufacture. Additionally or alternatively, in some examples, pre-programmed instructions (whether developed by the manufacturer or other third party) may be provided to an end user for download and installation after the manufacture of the safety trip device.

Although examples disclosed herein involve "pre-programmed" instructions for particular safety applications, such instructions may be programmed with the ability to define and/or specify particular values for relevant safety parameters and/or other configuration settings. Example safety parameters and/or other configuration settings associated with a particular safety application may include a trip limit (e.g., a setpoint), units for the trip limit, the direction of the trip (e.g., high or low), a delay period associated with the trip, etc. While an end user is given the ability to set such configuration settings, the rest of the operation and functionality of an associated safety application is pre-defined in the pre-programmed instructions. That is, the particular type and number of input signals and output signals and the procedures through which the I/O signals are analyzed and/or processed are already defined. In some examples, the safety trip devices disclosed herein include a communications interface to enable communications with supervisory and/or other systems using any suitable communications protocol (e.g., Modbus). In some such examples, the mapping of communication addresses (e.g., registers) for the different I/O parameters and/or signal values are also defined by the pre-programmed instructions such that a user need only specify basic communication port settings (e.g., Modbus port settings) to complete the setup of the system. As a result, the setup of safety applications using example safety trip devices disclosed herein is much faster and easier than fully programmable logic solvers and less prone to human error. Furthermore, the ability of the user to select different pre-programmed safety applications enables the example safety devices to be more flexible than safety relays and/or dedicated safety trip devices with a fixed functionality.

Another advantage of pre-programmed instructions developed by manufacturers and/or other third party entities is that such entities may obtain certification from relevant safety compliance authorities or governing bodies for the pre-programmed instructions. As a result, end users may confidently rely on such pre-programmed instructions as satisfying all necessary safety requirements and/or codes without having to incur the time and expense of programming their own applications and seeking the appropriate certifications each time they develop a new application. Further, example safety trip devices disclosed herein provide redundancy, thereby increasing reliability compared to other relatively low I/O count safety trip devices (e.g., safety relays and dedicated safety trip devices). Furthermore, unlike fully-programmable logic solvers that are more susceptible to being tampered with, some disclosed examples prevent an end user and/or malicious attacker from modifying the underlying (pre-programmed) instructions for particular safety applications. Furthermore, in some examples, end users and/or malicious attackers are prevented from changing the particular safety application being implemented and/or the associated configuration settings for the application without a physical confirmation of user presence, thereby increasing the cyber security of such devices.

Turning in detail to the drawings, FIG. 1 illustrates an example process control system 100 within which teachings of this disclosure may be implemented. This particular example corresponds to a standalone safety instrumented system (SIS) such as may be implemented at a wellhead. This example is provided for purposes of illustration only. Teachings disclosed herein may be implemented in connection with safety applications for any type of process control system (e.g., distributed control systems (DCSs), supervisory control and data acquisition (SCADA) systems, etc.) of greater or less complexity than what is shown in the illustrated example.

As shown in the illustrated example of FIG. 1, the example system 100 includes a remote terminal unit (RTU) 102 in communication with one or more field devices 104, 106. Additionally, as illustrated in FIG. 1, the RTU 102 is also in communication with a system host 108 (e.g., an existing SCADA network) associated with the example system 100. In the illustrated example, communications between the RTU 102 and the system host 108 may be accomplished via any suitable communications device and/or medium. In this example, the RTU 102 and the associated field devices 104, 106 implement the non-safety aspects of the example process control system 100.

The example system host 108 of FIG. 1 allows an operator, engineer, and/or other plant personnel (any of which may be referred to herein as a user) to review and/or interact with one or more operator display screens and/or applications that enable the user to view system variables, states, conditions, and/or alarms associated with the example control system 100; change control settings (e.g., set points, operating states, clear alarms, silence alarms, etc.) for the example control system 100; configure and/or calibrate devices within the example control system 100; perform diagnostics of devices within the example control system 100; and/or otherwise interact with devices within the example control system 100.

The example system host 108 of FIG. 1 may be implemented using one or more workstations and/or any other suitable computer systems and/or processing systems. For example, the system host 108 could be implemented using single processor personal computers, single or multi-processor workstations, a portable laptop computer, etc. The host 108 may be configured with one or more application stations to perform one or more information technology applications, user-interactive applications, and/or communication applications. For example, an application station may be configured to perform primarily process control-related applications, while another application station may be configured to perform primarily communication applications that enable the control system 100 to communicate with other devices or systems using any desired communication media (e.g., wireless, hardwired, etc.) and protocols (e.g., HTTP, SOAP, etc.).

The example system 100 of FIG. 1 includes one or more safety trip devices 110, 112, 114, each of which is in communication with one or more field devices 116, 118, 120, 122. Although the safety trip devices 110, 112, 114 are shown and described as being associated with the process control system 100, in some examples, the safety trip devices 110, 112, 114 may be implemented as part of one or more safety instrumented systems that operate independent of the rest of the system 100. In some examples, one or more of the field devices 116, 118, 120, 122 may be in communication with two or more of the safety trip devices 110, 112, 114. Additionally or alternatively, in some examples, one or more of the field devices 116, 118, 120, 122 in communication with one or more of the safety trip devices 110, 112, 114 may correspond to one or more of the field devices in communication with the RTU 102. In some examples, at least some of the example field devices 104, 106, 116, 118, 120, 122 may be smart field devices such as Fieldbus compliant valves, actuators, sensors, etc., in which case the smart field devices 104, 106, 116, 118, 120, 122 communicate with the RTU 102 and/or the safety trip devices 110, 112, 114 using the well-known Foundation Fieldbus protocol via any of wired or wireless communications media. Of course, other types of smart field devices and communication protocols could be used instead. For example, the smart field devices 104, 106, 116, 118, 120, 122 could instead be Profibus® and/or HART® compliant devices that communicate with the RTU 102 and/or the safety trip devices 110, 112, 114 using the well-known Profibus® and HART® communication protocols. Additionally or alternatively, in some examples, the field devices 104, 106, 116, 118, 120, 122 may be communicatively coupled over a local wireless network in accordance with the WirelessHART™ protocol. Further, in some examples, at least some of the field devices 104, 106, 116, 118, 120, 122 may be non-smart field devices such as conventional 4-20 milliamp (mA) or 0-24 volts direct current (VDC) devices that communicate with the RTU 102 and/or the safety trip devices 110, 112, 114 via respective hardwired links. Further detail regarding the communication of the example field devices 116, 118, 120, 122 with the example safety trip devices 110, 112, 114 is provided further below in connection with FIG. 3.

In the illustrated example, the safety trip devices 110, 112, 114 are in communication with the RTU 102 over a primary network 124 via a first switch 126 and a redundant network 128 via a second switch 130. In some examples, the switches 126, 130 may be omitted. In this example, the networks 124, 128 are implemented using the well-known Modbus protocol. However, in other examples, other communication protocols may be used. In the illustrated example of FIG. 1, each of the example safety trip devices 110, 112, 114 independently connects to the two networks 124, 128 to provide independent safety instrumented functions (SIFs). Communicatively coupling the safety trip devices 110, 112, 114 to the RTU 102 enables SIS information to be shared with personnel at a workstation associated with the system host 108.

The example process control system 100 of the illustrated example of FIG. 1 also includes a human machine interface 132 to enable the display of information associated with the operation of the process control system 100 including the RTU 102 and/or the safety trip devices 110, 112, 114. Further, in some examples, a configuration tool 134 may be communicatively coupled to the safety trip devices 110, 112, 114 to enable a user to configure and/or set up each safety trip device 110, 112, 114 to implement a particular safety application. In some examples, as shown in FIG. 1, the configuration tool 134 communicates with the safety trip devices 110, 112, 114 over the primary network 124 via the first switch 126. Additionally or alternatively, in some examples, the configuration tool 134 may be wired directly into a particular one of the safety trip devices 110, 112, 114. As mentioned above and described further below, in some examples, the safety trip devices 110, 112, 114 include pre-programmed instructions associated with different safety applications that are stored in memory and available to a user to select and configure. In some examples, the user selects the particular safety application via the configuration tool 134 and further specifies values for relevant configuration parameters and/or settings via the configuration tool 134. Further, in some examples, users may download a different (e.g., new) pre-programmed application from a website (e.g., maintained by the safety trip device manufacturer and/or a third party entity) using the configuration tool 134 and then install the new application onto the safety trip device 110, 112, 114. The configuration tool 134 may be a laptop computer, a notebook computer, a smartphone, a handheld device, and/or any other computing device.

Figure 2:
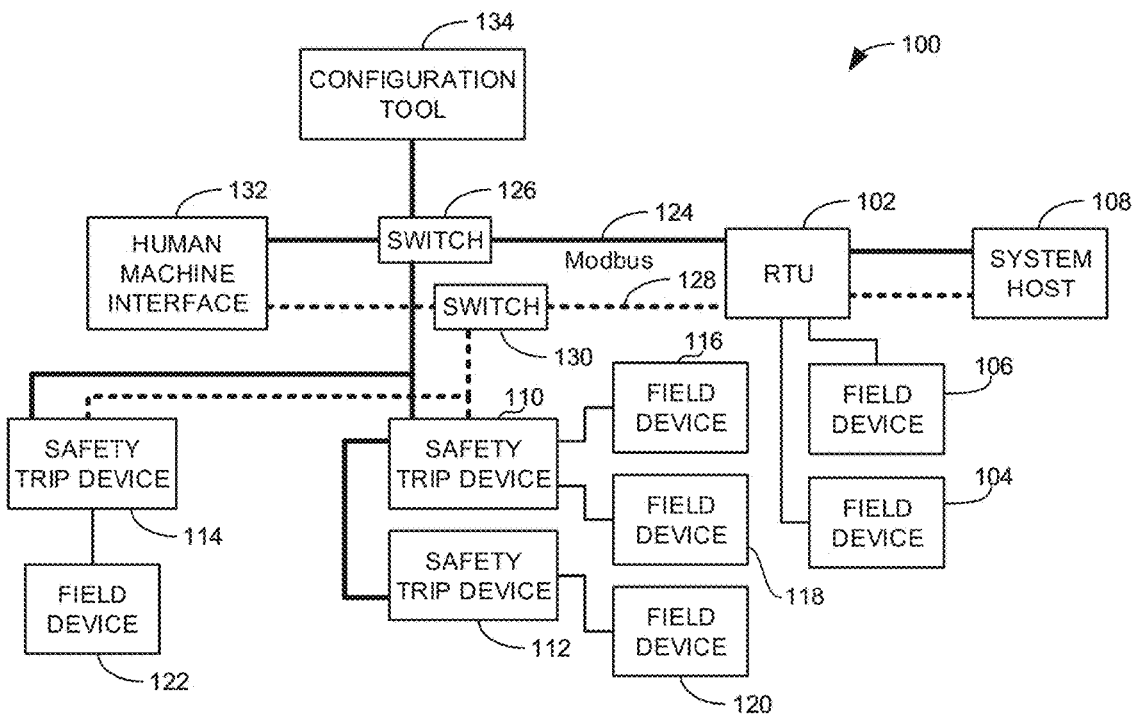
FIG. 2 illustrates the example process control system of FIG. 1 with the example safety trip devices in a different arrangement.

In some examples, the safety trip devices 110, 112, 114 may be configured to process any suitable number of I/O point and/or channels up to a limit defined by the size of the trip devices. In some examples, the safety trip devices 110, 112, 114 are constructed to handle up to twelve I/O channels, which is sufficient to provide flexibility to address many relatively low I/O count safety applications. In situations where the I/O count for a particular safety application involves more I/O channels than available on one safety trip device, multiple devices may be combined as shown in the illustrated example of FIG. 2. In particular, FIG. 2 shows the example process control system 100 of FIG. 1 reconfigured so that the second safety trip device 112 serves as a slave node to the first safety trip device 110 as a master node. Combining two safety trip devices in this manner doubles the I/O count available for a single SIF (e.g., 24 I/O instead of 12 I/O). While examples safety trip devices described herein include twelve I/O channels, other example trip devices may have more or fewer than 12 I/O channels.

Additionally, although the example safety trip devices 110, 112, 114 are described as including up to 12 I/O channels, the actual number of channels used for any particular application may be configured by the user based on the requirements of the particular application to be implemented. That is, in one application only four of the channels may be used while another application may involve the use of eleven of the channels. Furthermore, the particular type of I/O signal associated with any of the channels may be adapted to the particular application to be implemented. For instance, in one application the first I/O channel may be designated for a 4-20 mA analog input. In a second different application, the first I/O channel may be designated for a thermocouple input. Different types of I/O signals compatible with the example safety trip devices 110, 112, 114 include a 4-20 mA analog input signal, a 4-20 mA analog output signal, a 0-10V analog input signal, a 0-10V analog output signal, a thermocouple signal, a resistance temperature detector (RTD) signal, a dry or NAMUR discrete input signal, a high side discrete output signal, an isolated discrete input signal or discrete output signal for higher currents or higher VAC voltages, a relay contact output signal, etc. Enabling any combination of these different types of I/O signals in any quantity up to the structural capacity of a safety trip device (and more if multiple trip devices are combined) provides considerably more flexibility in adapting the safety trip device for different uses and applications than is possible using existing dedicated safety trip devices designed for a particular application. Furthermore, providing pre-programmed instructions corresponding to particular applications to a user for selection makes the configuration and setup of such devices significantly less complex than is possible with a fully programmable logic solver.

Figure 3:
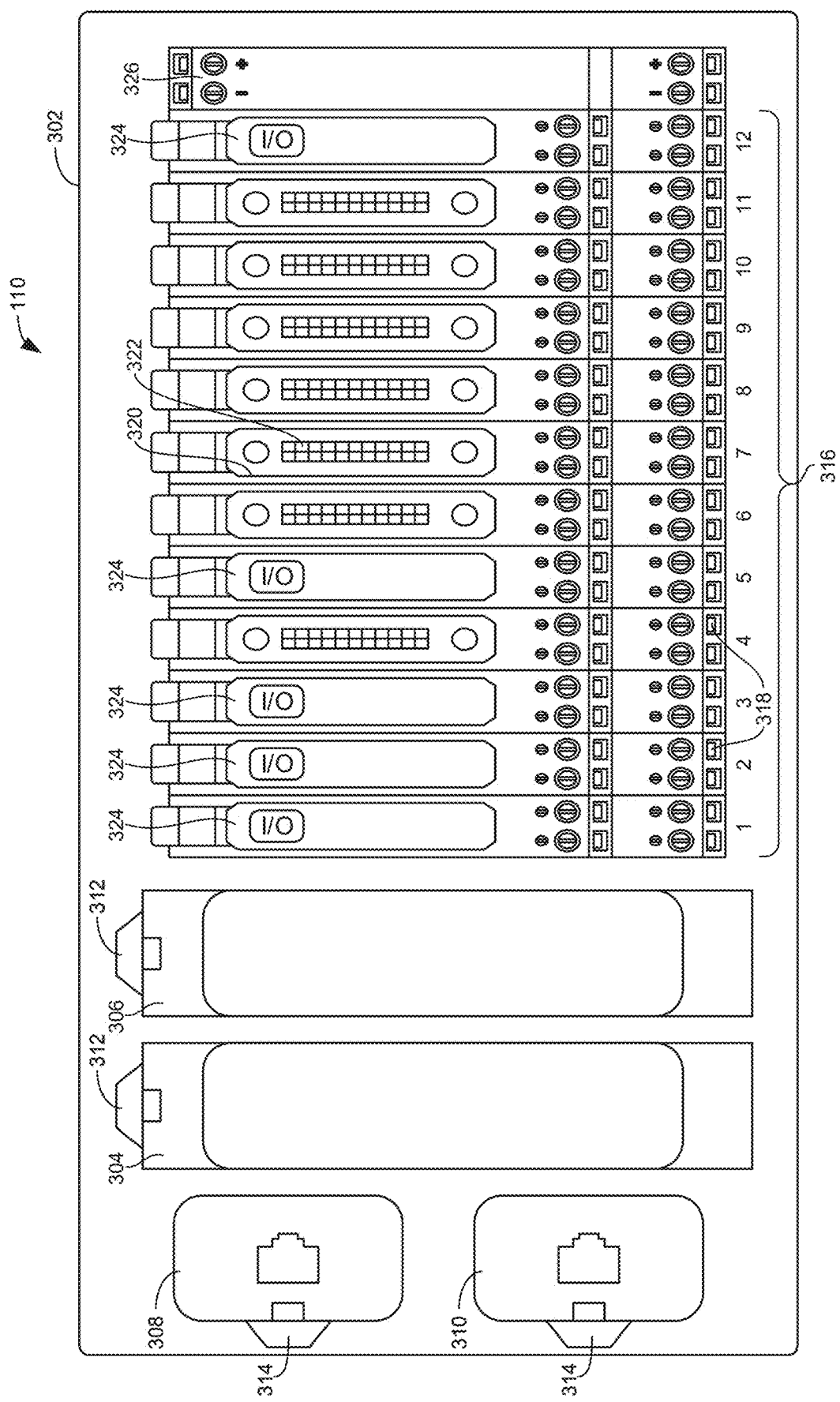
FIG. 3 illustrates any one of the example safety trip devices of FIGS. 1 and/or 2.

FIG. 3 illustrates a more detailed view of the first example safety trip device 110 of FIGS. 1 and/or 2. Although the following discussion is provided with respect to the first safety trip device 110, the second and third safety trip devices 112, 114 of FIGS. 1 and/or 2 may be similar or identical to the first safety trip device 110. The example safety trip device 110 of the illustrated example includes a housing 302 that carries one or more I/O scanners 304, 306. In this example, there are two I/O scanners with the first I/O scanner 304 serving as a primary I/O scanner and the second I/O scanner serving 306 as a redundant I/O scanner. The I/O scanners 304, 306 are communicatively coupled with respective I/O ports 308, 310 through which the I/O scanners 304, 306 may be communicatively coupled with the first and second networks 124, 128 shown in FIG. 1. Additionally or alternatively, the I/O ports 308, 310 may be used to communicatively interconnect multiple safety trip devices as shown by the first and second safety trip devices 110, 112 in FIG. 2. In some examples, the I/O scanners 304, 306 are communicatively coupled with the I/O ports 308, 310 via a backplane contained within the housing 302.

In some examples, the I/O scanners 304, 306 are selectively removeable from the housing 302, thereby enabling the replacement of a particular I/O scanner with a different scanner. In some such examples, clips or latches 312 and/or other locking mechanisms are used to secure the I/O scanners 304, 306 in place when coupled to the housing 302. In other examples, the I/O scanners 304, 306 are integrated with the housing 302. As with the I/O scanners 304, 306, in some examples, the I/O ports 308, 310 are selectively removeable from the housing 302, thereby enabling the replacement of a particular I/O port with a different port (e.g., ports that include multiple communication plugs rather than just one as shown in the illustrated example). In some examples, clips or latches 314 and/or other locking mechanisms secure the I/O ports 308, 310 to the housing. In other examples, the I/O ports 308, 310 are integrated with the housing 302.

As shown in the illustrated example, the safety trip device 110 also includes a plurality of terminal blocks 316. In this example, there are twelve terminal blocks 316. In other examples, the number of terminal blocks 316 may be more or less than twelve. The example terminal blocks 316 provide a first physical interface (e.g., wire termination points 318) onto which one or more wires from the field devices 116, 118, 120, 122 may be landed. Further, the example terminal blocks 316 include a second physical interface (e.g., a slot or socket 320 with electrical contacts 322 contained therein) to receive and hold one of a plurality of different types of I/O termination modules 324. In the illustrated example, I/O termination modules 324 are inserted in the slots 320 of the first, second, third, fifth and twelfth terminal blocks 316. In some examples, the termination modules are CHARMs (characterization modules) developed by Emerson Process Management.

In the illustrated example, the safety trip device 110 also includes an address plug 326. In some examples, the address plug 326 may correspond to one of two types that may be selectively swapped with each other in a corresponding slot in housing 302 of the safety trip device 110. A first type of address plug 326 is a runtime address plug, which is a standard type of address plug that provides addressing information for the different termination modules 324 to the I/O scanners 304, 306. A second type of address plug 326 is a configuration address plug, which may be used specifically when the safety trip device 110 is being configured for a particular safety application as discussed more fully below.

In some examples, the terminal blocks 316 are selectively removeable from the housing 302 to enable replacement by different terminal blocks (e.g., with different numbers and/or types of termination points 318 to connect to different types of field devices). In some such examples, the I/O termination modules 324 may be integrated with corresponding terminal blocks 316 such that the different I/O termination modules 324 and terminal blocks 316 may be selectively removed and/or replaced from the safety trip device 110 as a unit. In other examples, the terminal blocks 316 may be integrated with the housing 302 with only the I/O termination modules 324 being selectively removeable.

In the illustrated example, the electrical contacts 322 on the terminal blocks 316 are electrically coupled to the termination points 318 to enable communications between the field devices 116, 118, 120, 122 (wired to the termination points 318) and the I/O termination modules 324 inserted in the slots 320 of the corresponding terminal blocks 316. Further, the electrical contacts 322 of the terminal blocks 316 are electrically coupled to the backplane of the housing 302 to enable communications between the I/O scanners 304, 306 and corresponding I/O termination modules 324 inserted in the terminal blocks 316. More particularly, in some examples, the backplane of the housing 302 includes a universal I/O bus (e.g., a common or shared communication bus) that communicatively couples the I/O termination modules 324 in any of the terminal blocks 316 to the I/O scanners 304, 306.

In some examples, the I/O signals transmitted to or received from the different field devices 116, 118, 120, 122 may differ in type based on the type of field device involved. As a result, the I/O signals may not be directly compatible with the universal I/O bus because they are based on different communication protocols. Accordingly, in some examples, transmissions to and from different types of field devices 116, 118, 120, 122 associated with different types of I/O signals (communicated based on different communication protocols) are processed by different types of I/O termination modules 324 configured to handle the corresponding types of I/O signals. That is, different types of I/O termination modules 324 include different logic circuitry to receive field device information based on a particular communication protocol from corresponding field devices and communicate the field device information to the I/O scanners 304, 306 using a different communication protocol associated with the universal I/O bus. Likewise, the I/O scanners 304, 306 can communicate field device information to the I/O termination modules 324 based on the communication protocol associated with the universal I/O bus and then the logic circuitry in each I/O termination module 324 can extract the field device information and communicate the same to respective field devices in accordance with the particular type of I/O signal and associated communication protocol intended for each particular field device.

The ability to use different I/O termination modules 324 constructed to process different types of I/O signals (associated with different communication protocols) enables the safety trip device 110 to be adapted to different safety applications by selecting the appropriate types of I/O termination modules 324 corresponding to the particular types of I/O signals involved in each desired application and inserting such modules 324 in the terminal blocks 316. Of course, for the I/O scanners 304, 306 to be able to appropriately analyze and/or process the I/O signals for a given safety application, the I/O scanners 304, 306 need to be programmed and/or configured to do so. In some examples, the I/O scanners 304, 306 include memory to store pre-programmed instructions associated with different types of safety applications to eliminate the need for an end user to program the I/O scanners each time the safety trip device 110 is adapted to a new safety application. In some examples, the pre-programmed instructions are stored in the memory at the time of manufacture prior to the sale of the safety trip device 110. Additionally or alternatively, the pre-programmed instructions may be downloaded by the end user and stored on the I/O scanners 304, 306 after purchase of the safety trip device 110.

Providing pre-programmed instructions for particular safety applications that an end user does not need to develop significantly reduces the complexity of setting up the safety trip device 110 for such safety applications. For instance, in some examples, the pre-programmed instructions define the number and types of I/O signals involved for a particular safety application as well as the interrelationship of such signals and how they are to be treated and/or processed. Further, in some examples, the pre-programmed instructions not only define the logic sequence(s) of operation for a particular safety application, but also define the mapping of communication addresses (e.g., registers) for the different I/O signals involved in the particular application for communication with external components (e.g., the host system 108 in FIG. 1). As a result, when an end user desires to configure the safety trip device 110 to implement a particular safety application, the user selects the relevant pre-programmed instructions, inserts the relevant I/O termination modules 324, and defines certain configuration settings and/or communication port settings. In some examples, the configuration settings include defining values for relevant safety parameters such as the value of a trip limit (e.g., a setpoint), the units for the trip limit, the direction of the trip (e.g., high or low), a delay period associated with the trip, etc. In some examples, the communication port settings (e.g., Modbus port settings) include defining Internet protocol (IP) addresses, subnet mask, port numbers, etc., associated with the terminal blocks 316 and/or the associated I/O signals associated with the safety application.

In some examples, the pre-programmed instructions may be certified by a relevant safety compliance authority or governing body. Such a certification need only be done once and then can be reliably used on any number of safety trip devices 110 by any number of end users. To ensure that the certification remains valid, in some examples, end users are prevented from modifying the pre-programmed instructions. That is, while a user may select and provide suitable configuration settings for a particular implementation of the associated safety application, users may be prevented from accessing, viewing, and/or modifying the underlying logic sequences and associated relationships and interactions of the I/O signals as defined in the pre-programmed instructions. While end users may not be able to modify pre-programmed instructions stored on the I/O scanners 304, 306, in some examples, end users may develop their own programs to be implemented by the I/O scanners 304, 306 when, for example, pre-programmed instructions for a particular safety application are not available. In such examples, the end user may be able to update and/or modify the program as needed.

In some examples, the selection of a particular safety application associated with pre-programmed instructions stored on the I/O scanners 304, 306 and the associated configuration of such instructions for implementation is limited to when a configuration address plug 326 is inserted in the safety trip device 110 in place of a standard runtime address plug 326. Limiting modifications to the configuration and setup of a particular safety application to when the configuration address plug 326 is inserted in the safety trip device 110 effectively provides a test for user presence for enhanced security before modifications can be made because a user must physically insert the configuration address plug 326. Once the safety trip device 110 has been set up and configured for a particular safety application and the standard runtime address plug has replaced the configuration address plug 326, the safety trip device 110 operates as configured without the risk of someone inadvertently or maliciously tampering with the configuration settings for the application (and/or switching the operation of the safety trip device 110 to correspond to a different safety application associated with a different set of pre-programmed instructions). In other words, the configuration address plug 326 places the safety trip device 110 in a configuration mode in which the safety application can be modified but cannot be implemented. On the other hand, the runtime address plug 326 places the safety trip device into a run mode in which the safety application can be implemented but cannot be modified.

Figure 4:
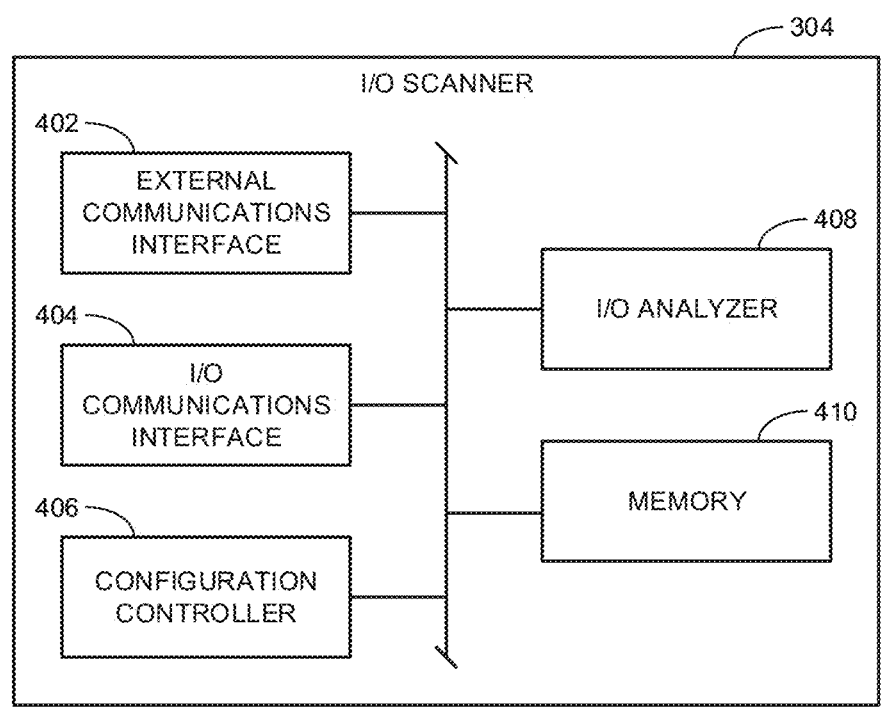
FIG. 4 is a block diagram illustrating an example implementation of one of the example I/O scanners of FIG. 3.

FIG. 4 is a block diagram illustrating an example implementation of the primary I/O scanner 304 of FIG. 3. Although the following discussion is provided with respect to the primary I/O scanner 304, the redundant I/O scanner 306 may be similar or identical to the primary I/O scanner 304. As shown in the illustrated example, the primary I/O scanner 304 includes an example external communications interface 402, an example I/O communications interface 404, an example configuration controller 406, an example I/O analyzer 408, and example memory 410.

The example external communications interface 402 enables communications with components external to the safety trip device 110. That is, in this example, the external communications interface 402 interfaces with the corresponding I/O ports 308, 310 to enable communications with the networks 124, 128 and/or communications with other safety trip devices 110. For instance, among other things, a user may select and/or configure a particular safety application on the safety trip device 110 via the configuration tool 134 of FIGS. 1 and 2 that is in communication with the safety trip device 110 via the external communications interface 402 of the I/O scanner 304.

The example I/O communications interface 404 enables communications with the different I/O termination modules 324 inserted in the terminal blocks 316 on the safety trip device 110. In such examples, the I/O communications interface 404 communicates with the I/O termination modules 324 via the backplane of the housing 302 using the universal I/O bus as described above. In some examples, the I/O communications interface 404 also enables communications between the primary I/O scanner 304 and the redundant I/O scanner 306. As a result, in some examples, modifications and/or changes to one of the I/O scanners 304, 306 is automatically passed to the other. Although the external communications interface 402 is shown separately from the I/O communications interface 404, in some examples, the external communications interface 402 may be integrated and/or combined with the I/O communications interface 404.

The example configuration controller 406 of the I/O scanner 304 of FIG. 4 manages the user selection and configuration of a safety application to be implemented by the safety trip device 110. In some examples, the configuration controller 406 determines whether the address plug 326 is a configuration address plug or a runtime address plug. If the plug 326 is a runtime address plug, the configuration controller 406 prevents a user from selecting (e.g., changing) a safety application designation for implementation on the safety trip device 110. Furthermore, if the address plug 326 is a runtime address plug, the configuration controller 406 may also prevent a user from modifying the configuration settings for the currently designated safety application. On the other hand, if the address plug 326 is a configuration address plug, the configuration controller 406 may enable a user to select and/or configure a safety application for implementation by the safety trip device 110. However, the configuration address plug 326, by its very nature of lacking valid address information, prevents the safety application from actually being implemented. Only when the standard runtime address plug 326 is reinserted into the safety trip device 110 will the designated safety application be capable of implementation.

As mentioned above, in some examples, a user uses the configuration tool 134 to select and configure a particular safety application. Thus, in some examples, the configuration controller 406 communicates with the configuration tool 134 via the external communications interface 402 to provide prompts and/or options for a user to select and/or provide feedback during the configuration process. More particularly, in some examples, the configuration controller 406 provides available safety applications to a user for selection that are rendered on a display screen of the configuration tool 134. In some examples, the configuration controller 406 may generate a graphical user interface with the relevant user options for rendering via a display on the configuration tool 134. In other examples, the configuration controller 406 may transmit relevant information to enable the configuration tool 134 to generate a suitable graphical user interface to display the information to the user. Available safety applications may be displayed in any suitable matter (e.g., in a dropdown list, in a table, etc.).

In some examples, the available safety applications provided to the user for selection correspond to all safety applications associated with pre-programmed instructions stored in the memory 410 of the I/O scanner 304. Additionally or alternatively, in some examples, the available safety applications provided to the user may include applications the user (or a different end user) has previously developed and stored in the memory 410. In some examples, the available safety applications provided to the user for selection may correspond to a subset of all safety applications with pre-programmed instructions stored in the memory 410. For instance, in some examples, only the safety applications associated with a particular type of process control system (e.g., wellhead safety applications) may be provided to the user.

In some examples, the available safety applications may include pre-programmed instructions that are not yet stored in the memory 410. In such examples, the user may be provided the option to obtain such pre-programmed instructions by downloading them from a website using the configuration tool 134. Once downloaded, the configuration tool 134 may transmit the pre-programmed instructions to the I/O scanner 304 to be stored in the memory 410. In some examples, the configuration controller 406 may not specifically identify pre-programmed applications that are not stored in the memory 410 but nevertheless provide an option for the user to check for new and/or different safety applications other than those stored in the memory 410 that may be available.

The available safety applications may correspond to any suitable type of application that may be implemented in a safety instrumented system. Different example safety applications that may have pre-programmed instructions that are stored in the memory 410 include burner management system (BMS) applications, emergency shutdown (ESD) applications, automatic overflow protection system (AOPS) applications, high-integrity pressure protection system (HIPPS) applications, single voter applications (e.g., 1 out of 2 (1oo2), 2 out of 3 (2oo3), etc.), multi-iteration voter applications (e.g., two iterations of a 2oo3 voter, three iterations of a 1oo2 voter, etc.), wellhead applications, etc.

In some examples, once a user selects a particular safety application to be implemented, the configuration controller 406 retrieves the associated instructions stored in the memory 410 and prompts the user (e.g., via the configuration tool 134) to provide values for relevant parameters and other configuration settings (e.g., trip limits, trip direction, time delays, etc.). In some examples, the configuration controller 406 may provide the user (e.g., via the configuration tool 134) a listing of the types of I/O signals involved in the selected safety application to enable the user to confirm the correct I/O termination modules 324 are inserted in the terminal blocks 316 of the safety trip device 110. In some examples, a user may specify the types of termination modules 324 installed in the safety trip device 110 as well as their locations within the different terminal blocks 316 to enable the configuration controller 406 to confirm the correct I/O termination modules 324 are used based on the I/O signals involved with the selected application as defined in the pre-programmed instructions. Further, the user specifying the location (e.g., I/O channel) for each of the I/O termination modules 324 enables the configuration controller 406 to appropriately configure their communications addresses. In some examples, the configuration controller 406 may automatically scan the I/O termination modules 324 to confirm the modules are the correct types corresponding to the I/O signals defined in the pre-programmed instructions associated with the safety application selected by the user and/or to determine the particular terminal block 316 in which each I/O termination module 324 is inserted. In some examples, if an incorrect I/O termination module 324 is detected and/or a relevant I/O termination module 324 is not detected, the configuration controller 406 may generate an alert or error message to inform the user of the detected error.

Once the configuration controller 406 has received all configuration settings and communication port settings from the user, the configuration controller 406 may monitor for the removal of the configuration address plug 326 from the safety trip device 110 and replacement with a runtime address plug. Once the runtime address plug 326 is inserted, control and/or operation of the I/O scanner 304 passes to the example I/O analyzer 408. The I/O analyzer 408 implements the pre-programmed instructions to control the implementation of the user selected safety application. That is, the I/O analyzer 408 generates field device information to be communicated to intended field devices 116, 118, 120, 122 and also receives and processes field device information received from the field devices 116, 118, 120, 122. More particularly, the I/O analyzer 408 compares the relevant I/O signals to the user-configured trip limits and/or otherwise processes the I/O signals in accordance with the logic sequence(s) of operations set forth in the pre-programmed instructions to enable the associated safety application.

While an example manner of implementing the I/O scanner 304 of FIG. 3 is illustrated in FIG. 4, one or more of the elements, processes and/or devices illustrated in FIG. 4 may be combined, divided, re-arranged, omitted, eliminated and/or implemented in any other way. Further, the example external communications interface 402, the example I/O communications interface 404, the example configuration controller 406, the example I/O analyzer 408, the example memory 410 and/or, more generally, the example I/O scanner 304 of FIG. 3 may be implemented by hardware, software, firmware and/or any combination of hardware, software and/or firmware. Thus, for example, any of the example external communications interface 402, the example I/O communications interface 404, the example configuration controller 406, the example I/O analyzer 408, the example memory 410 and/or, more generally, the example I/O scanner 304 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example external communications interface 402, the example I/O communications interface 404, the example configuration controller 406, the example I/O analyzer 408, and/or the example memory 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example I/O scanner 304 of FIG. 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
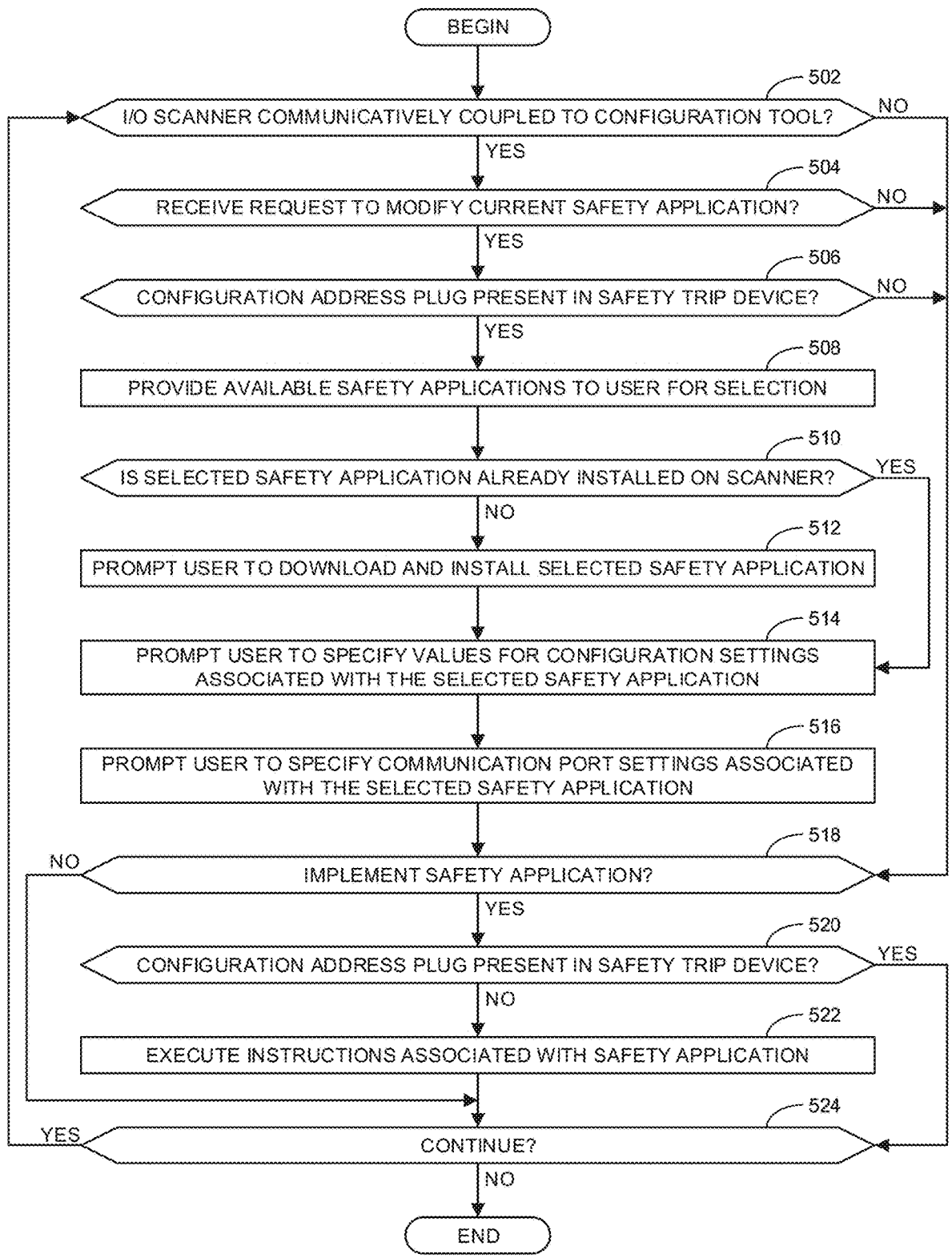
FIG. 5 is a flowchart representative of machine readable instructions that may be executed to implement the example I/O scanner of FIG. 4.

A flowchart representative of example hardware logic, machine readable instructions, hardware implemented state machines, and/or any combination thereof for implementing the I/O scanner 304 of FIGS. 3 and/or 4 is shown in FIG. 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example I/O scanner 304 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 5 begins at block 502 where the example configuration controller 406 determines whether the I/O scanner 304 is communicatively coupled to the configuration tool 134. If so, control advances to block 504 where the example external communications interface 402 determines whether a request to modify the current safety application is received. If so, control advances to block 506 where the example configuration controller 406 determines whether a configuration address plug 326 is present in the safety trip device 110. If so, control advances to block 508 where the example configuration controller 406 provides available safety applications to a user for selection. Upon receiving a user selection, at block 510, the example configuration controller 406 determines whether the selected safety application is already installed on the I/O scanner 304. If not, control advances to block 512 where the example configuration controller 406 prompts the user to download and install the selected safety application. In some examples, the user may independently download the safety application without being prompted to do so (e.g., prior to beginning the process to setup the particular safety application. In some such examples, the user may simply indicate the user desires to install a new safety application on the I/O scanner 304. Once the application is installed, control advances to block 514. Returning to block 510, if the selected safety application is already installed, control advances directly to block 514. At block 514, the example configuration controller 406 prompts the user to specify values for configuration settings associated with the selected safety application. At block 516, the example configuration controller 406 prompts the user to specify communication port settings associated with the selected safety application. Thereafter, control advances to block 518.

Returning to block 502, if the I/O scanner 304 is not communicatively coupled to the configuration tool 134, control advances directly to block 518. Similarly, returning to block 504, if the external communications interface 402 does not receive a request to modify the current safety application, control advances direction to block 518. Likewise, returning to block 506, if the example configuration controller 406 determines that the configuration address plug 326 is not present (e.g., a runtime address plug is in the safety trip device 110), control advances directly to block 518. At block 518, the example 10 analyzer 408 determines whether to implement the safety application. In some examples, this determination is made based on feedback from the user indicating the configuration of the application is complete and/or that the user desires to implement the application after proceeding through blocks 508-516. This determination may additionally or alternatively be made based on the status of the system in view of blocks 508-516 being skipped based on a decision in any one of blocks 502-506. If the safety application is not to be implemented, control advances to block 524. If the safety application is to be implemented, control advances to block 520 where the example configuration controller 406 again determines whether the configuration address plug 326 is present in the safety trip device 110. This determination is made at block 506 to prevent unintended changes to the selection and/or configuration of a safety application whereas this same determination is made at block 520 to prevent the unintended implementation of the currently selected and configured safety application. If the configuration address plug 326 is present, the safety application is not implemented and control advances to block 524. If the configuration address plug 326 is not present (e.g., a runtime address plug is in the safety trip device 110), control advances to block 522 where the example I/O analyzer 408 executes instructions associated with the safety application. Thereafter, control advances to block 504, where it is determined whether to continue the process. If so, control returns to block 502. Otherwise, the example process of FIG. 5 ends.

Figure 6:
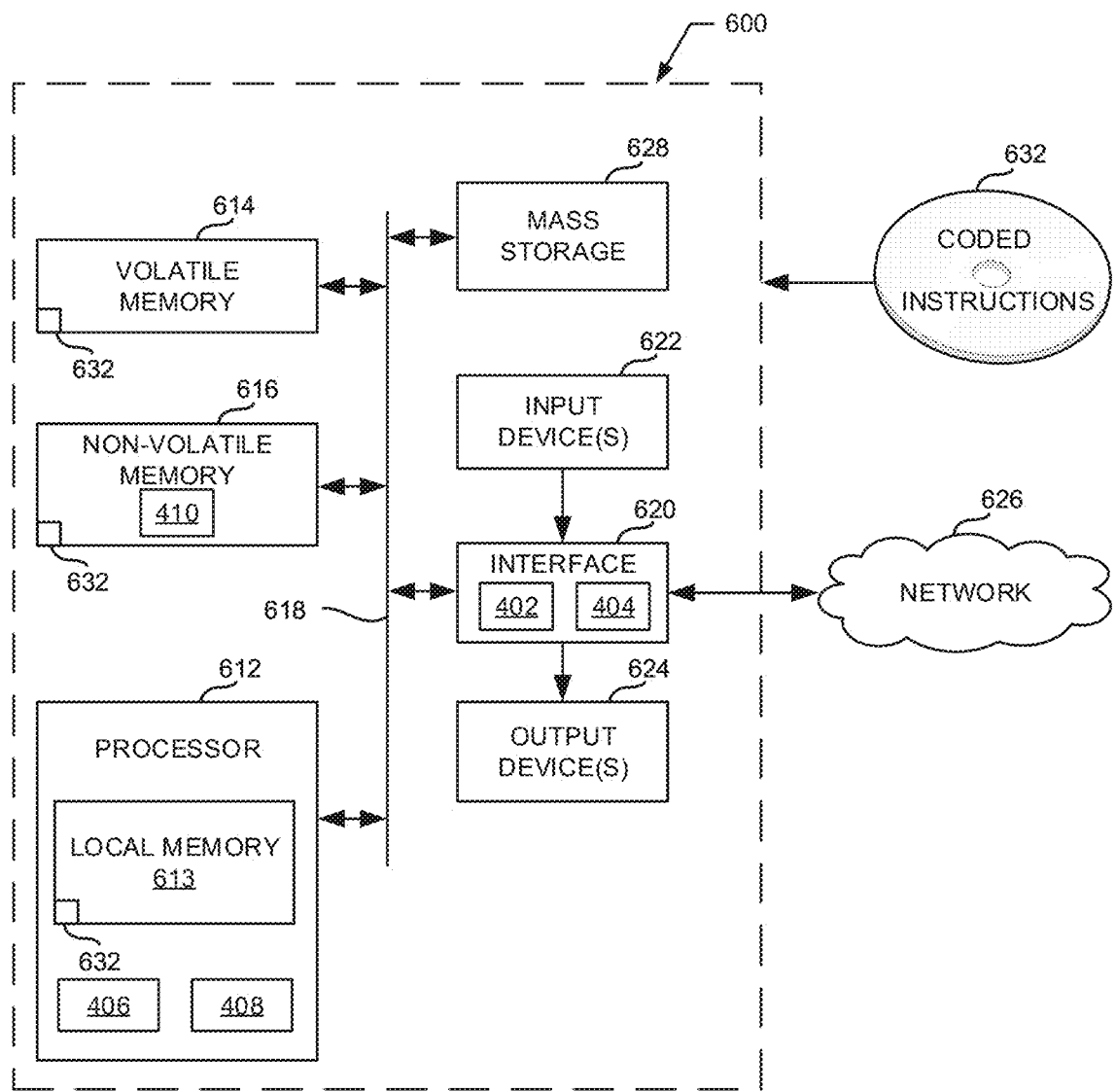
FIG. 6 is a block diagram of an example processing platform structured to execute the instructions of FIG. 5 to implement the example I/O scanner of FIG. 4.

FIG. 6 is a block diagram of an example processor platform 600 structured to execute the instructions of FIG. 5 to implement the I/O scanner 304 of FIGS. 3 and/or 4. The processor platform 600 can be, for example, a server, a personal computer, a workstation, a self-learning machine (e.g., a neural network), a mobile device (e.g., a cell phone, a smart phone, a tablet such as an iPad™), or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example configuration controller 406 and the example I/O analyzer 408.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller. In this example, the non-volatile memory 616 includes the memory 410.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 620 implements the example external communications interface 402 and the example I/O communications interface 404.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. In this example, the mass storage device 628 includes the memory 410.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that enable the setup and configuration of a safety trip device in much less time and effort that required using existing fully programmable logic solvers because examples disclosed herein provide users with the ability to select pre-programmed instructions corresponding to particular safety applications. Such pre-programmed instructions may be certified by relevant safety compliance authorities, thereby giving end users greater confidence in the reliability of such safety applications and/or reducing the complexity and cost of developing their own applications and seeking their own certification on such applications. Further, some example safety trip devices can only be configured and setup when a configuration module is inserted therein and only implemented after the configuration module is removed, thereby providing great security than existing fully programmable logic solvers that are more susceptible to being tampered with. While examples disclosed herein provide a much simpler end-user experience based on the pre-programmed instructions, the examples also provide much more flexibility that other dedicated safety trip devices and/or safety relays because example safety trip devices disclosed herein may store multiple different sets of instructions associated with different types of safety applications. This flexibility is made possible by implementing example safety trip devices with selectively removeable termination modules that can handle different types of I/O signals, such that any particular safety application may be implemented simply by inserted the appropriate termination modules corresponding the I/O signals involved in the particular safety application of interest.

Example 1 includes an apparatus comprising a configuration controller to provide a plurality of available safety applications for implementation by a safety trip device associated with a process control system to a user for selection, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device, and in response to a user selection of the first safety application, prompt the user to specify values for configuration settings associated with the first safety application, the first pre-programmed instructions defining the configuration settings, and an I/O analyzer to implement the first safety application based on the values for the configuration settings specified by the user and based on the first pre-programmed instructions.

Example 2 includes the apparatus of example 1, wherein the first set of I/O signals corresponds to a first I/O count and the second set of I/O signals corresponds to a second I/O count, the first I/O count different than the second I/O count.

Example 3 includes the apparatus of example 1, wherein the first set of I/O signals corresponds to a first subset of different types of I/O signals and the second set of I/O signals correspond to a second subset of the different types of I/O signals, the first subset of the different types of I/O signals different than the second subset of the different types of I/O signals.

Example 4 includes the apparatus of example 3, wherein the first set of I/O signals are communicated between a processor of the safety trip device and field devices via a first set of termination modules carried by a housing of the safety trip device, the first set of termination modules including different types of termination modules corresponding to the first subset of the different types of I/O signals.

Example 5 includes the apparatus of example 4, wherein ones of the first set of termination modules are selectively replaceable within the housing by ones of a second set of termination modules, the second set of termination modules including different types of termination modules corresponding to the second subset of the different types of I/O signals.

Example 6 includes the apparatus of example 1, wherein the plurality of available safety applications includes a first set of applications stored in the memory and a second set of applications available for download.

Example 7 includes the apparatus of example 1, wherein ones of the plurality of available safety applications are certified by a safety compliance authority prior to being provided to the user for selection.

Example 8 includes the apparatus of example 1, wherein the configuration controller is to in response to a configuration address plug being inserted in a slot of a housing of the safety trip device, provide the plurality of available safety applications to the user for selection and enable the user to specify values for configuration settings associated with the first safety application, and in response to a runtime address plug being inserted in the slot of the housing of the safety trip device, prevent the user from changing the configuration settings or switching from the first safety application to the second safety application.

Example 9 includes a non-transitory computer readable medium comprising instructions that, when executed, cause a safety trip device to at least provide a plurality of available safety applications for implementation by the safety trip device associated with a process control system to a user for selection, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device, in response to a user selection of the first safety application, prompt the user to specify values for configuration settings associated with the first safety application, the first pre-programmed instructions defining the configuration settings, and implement the first safety application based on the values for the configuration settings specified by the user and based on the first pre-programmed instructions.

Example 10 includes the non-transitory computer readable medium of example 9, wherein the first set of I/O signals corresponds to a first I/O count and the second set of I/O signals corresponds to a second I/O count, the first I/O count different than the second I/O count.

Example 11 includes the non-transitory computer readable medium of example 9, wherein the first set of I/O signals corresponds to a first subset of different types of I/O signals and the second set of I/O signals correspond to a second subset of the different types of I/O signals, the first subset of the different types of I/O signals different than the second subset of the different types of I/O signals.

Example 12 includes the non-transitory computer readable medium of example 11, wherein the first set of I/O signals are communicated between a processor of the safety trip device and field devices via a first set of termination modules carried by a housing of the safety trip device, the first set of termination modules including different types of termination modules corresponding to the first subset of the different types of I/O signals.

Example 13 includes the non-transitory computer readable medium of example 12, wherein ones of the first set of termination modules are selectively replaceable within the housing by ones of a second set of termination modules, the second set of termination modules including different types of termination modules corresponding to the second subset of the different types of I/O signals.

Example 14 includes the non-transitory computer readable medium of example 9, wherein the plurality of available safety applications includes a first set of applications stored in the memory and a second set of applications available for download.

Example 15 includes the non-transitory computer readable medium of example 9, wherein ones of the plurality of available safety applications are certified by a safety compliance authority prior to being provided to the user for selection.

Example 16 includes the non-transitory computer readable medium of example 9, wherein the instructions further cause the safety trip device to in response to a configuration address plug being inserted in a slot of a housing of the safety trip device, provide the plurality of available safety applications to the user for selection and enable the user to specify values for configuration settings associated with the first safety application, and in response to a runtime address plug being inserted in the slot of the housing of the safety trip device, prevent the user from changing the configuration settings or switching from the first safety application to the second safety application.

Example 17 includes a method comprising providing a plurality of available safety applications for implementation by a safety trip device associated with a process control system to a user for selection, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device, in response to a user selection of the first safety application, prompting the user to specify values for configuration settings associated with the first safety application, the first pre-programmed instructions defining the configuration settings, and implementing the first safety application based on the values for the configuration settings specified by the user and based on the first pre-programmed instructions.

Example 18 includes the method of example 17, wherein the first set of I/O signals corresponds to a first I/O count and the second set of I/O signals corresponds to a second I/O count, the first I/O count different than the second I/O count.

Example 19 includes the method of example 17, wherein the first set of I/O signals corresponds to a first subset of different types of I/O signals and the second set of I/O signals correspond to a second subset of the different types of I/O signals, the first subset of the different types of I/O signals different than the second subset of the different types of I/O signals.

Example 20 includes the method of example 19, wherein the first set of I/O signals are communicated between a processor of the safety trip device and field devices via a first set of termination modules carried by a housing of the safety trip device, the first set of termination modules including different types of termination modules corresponding to the first subset of the different types of I/O signals.

Example 21 includes the method of example 20, wherein ones of the first set of termination modules are selectively replaceable within the housing by ones of a second set of termination modules, the second set of termination modules including different types of termination modules corresponding to the second subset of the different types of I/O signals.

Example 22 includes the method of example 17, wherein the plurality of available safety applications includes a first set of applications stored in the memory and a second set of applications available for download.

Example 23 includes the method of example 17, wherein ones of the plurality of available safety applications are certified by a safety compliance authority prior to being provided to the user for selection.

Example 24 includes the method of example 17, further including in response to a configuration address plug being inserted in a slot of a housing of the safety trip device, providing the plurality of available safety applications to the user for selection and enabling the user to specify values for configuration settings associated with the first safety application, and in response to a runtime address plug being inserted in the slot of the housing of the safety trip device, preventing the user from changing the configuration settings or switching from the first safety application to the second safety application.

Example 25 includes a safety trip device comprising a housing including a backplane, terminal blocks including respective slots, the slots to receive a first set of termination modules to communicate with a first set of field devices associated with a first safety application associated with a process control system, the slots to receive a second set of termination modules to communicate with a second set of field devices associated with a second safety application associated with the process control system, and an I/O scanner to communicate with the termination modules in the slots of the terminal blocks via the backplane, the I/O scanner including memory to store first pre-programmed instructions defining operation of the first safety application and to store second pre-programmed instructions defining operation of the second safety application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a configuration controller to:
      in response to a configuration address plug being inserted in a slot of a housing of a safety trip device associated with a process control system, provide a plurality of available safety applications for implementation by the safety trip device to a user for selection and enable the user to specify values for configuration settings associated with selected ones of the safety applications, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device;
      in response to a user selection of the first safety application, prompt the user to specify the values for the configuration settings associated with the first safety application, the first pre-programmed instructions defining the configuration settings;
      in response to a runtime address plug being inserted in the slot of the housing of the safety trip device, prevent the user from changing the configuration settings or switching from the first safety application to the second safety application; and
   an I/O analyzer to implement the first safety application based on the values for the configuration settings specified by the user and based on the first pre-programmed instructions.

2. The apparatus of claim 1, wherein the first set of I/O signals corresponds to a first I/O count and the second set of I/O signals corresponds to a second I/O count, the first I/O count different than the second I/O count.

3. The apparatus of claim 1, wherein the first set of I/O signals corresponds to a first subset of different types of I/O signals and the second set of I/O signals correspond to a second subset of the different types of I/O signals, the first subset of the different types of I/O signals different than the second subset of the different types of I/O signals.

4. The apparatus of claim 3, wherein the first set of I/O signals are communicated between a processor of the safety trip device and field devices via a first set of termination modules carried by the housing of the safety trip device, the first set of termination modules including different types of termination modules corresponding to the first subset of the different types of I/O signals.

5. The apparatus of claim 4, wherein ones of the first set of termination modules are selectively replaceable within the housing by ones of a second set of termination modules, the second set of termination modules including different types of termination modules corresponding to the second subset of the different types of I/O signals.

6. The apparatus of claim 1, wherein the plurality of available safety applications includes a first set of applications stored in the memory and a second set of applications available for download.

7. The apparatus of claim 1, wherein ones of the plurality of available safety applications are certified by a safety compliance authority prior to being provided to the user for selection.

8. A non-transitory computer readable medium comprising instructions that, when executed, cause a safety trip device to at least:
   in response to a configuration address plug being inserted in a slot of a housing of the safety trip device associated with a process control system, provide a plurality of available safety applications for implementation by the safety trip device to a user for selection and enable the user to specify values for configuration settings associated with selected ones of the safety applications, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device;
   in response to a user selection of the first safety application, prompt the user to specify the values for the configuration settings associated with the first safety application, the first pre-programmed instructions defining the configuration settings;
   in response to a runtime address plug being inserted in the slot of the housing of the safety trip device, prevent the user from changing the configuration settings or switching from the first safety application to the second safety application; and
   implement the first safety application based on the values for the configuration settings specified by the user and based on the first pre-programmed instructions.

9. The non-transitory computer readable medium of claim 8, wherein the first set of I/O signals corresponds to a first I/O count and the second set of I/O signals corresponds to a second I/O count, the first I/O count different than the second I/O count.

10. The non-transitory computer readable medium of claim 8, wherein the first set of I/O signals corresponds to a first subset of different types of I/O signals and the second set of I/O signals correspond to a second subset of the different types of I/O signals, the first subset of the different types of I/O signals different than the second subset of the different types of I/O signals.

11. The non-transitory computer readable medium of claim 10, wherein the first set of I/O signals are communicated between a processor of the safety trip device and field devices via a first set of termination modules carried by the housing of the safety trip device, the first set of termination modules including different types of termination modules corresponding to the first subset of the different types of I/O signals.

12. The non-transitory computer readable medium of claim 11, wherein ones of the first set of termination modules are selectively replaceable within the housing by ones of a second set of termination modules, the second set of termination modules including different types of termination modules corresponding to the second subset of the different types of I/O signals.

13. The non-transitory computer readable medium of claim 8, wherein the plurality of available safety applications includes a first set of applications stored in the memory and a second set of applications available for download.

14. The non-transitory computer readable medium of claim 8, wherein ones of the plurality of available safety applications are certified by a safety compliance authority prior to being provided to the user for selection.

15. A method comprising:
- in response to a configuration address plug being inserted in a slot of a housing of a safety trip device associated with a process control system, providing a plurality of available safety applications for implementation by the safety trip device to a user for selection and enabling the user to specify values for configuration settings associated with selected ones of the safety applications, a first one of the safety applications associated with a first set of I/O signals, a second one of the safety applications associated with a second set of I/O signals, the first set of I/O signals different than the second set of I/O signals, the first safety application implemented based on first pre-programmed instructions stored in memory of the safety trip device, the second safety application implemented based on second pre-programmed instructions stored in the memory of the safety trip device;
- in response to a user selection of the first safety application, prompting the user to specify the values for the configuration settings associated with the first safety application, the first pre-programmed instructions defining the configuration settings;
- in response to a runtime address plug being inserted in the slot of the housing of the safety trip device, preventing the user from changing the configuration settings or switching from the first safety application to the second safety application; and
- implementing the first safety application based on the values for the configuration settings specified by the user and based on the first pre-programmed instructions.

16. The method of claim 15, wherein the first set of I/O signals corresponds to a first I/O count and the second set of I/O signals corresponds to a second I/O count, the first I/O count different than the second I/O count.

17. The method of claim 15, wherein the first set of I/O signals corresponds to a first subset of different types of I/O signals and the second set of I/O signals correspond to a second subset of the different types of I/O signals, the first subset of the different types of I/O signals different than the second subset of the different types of I/O signals.

18. The method of claim 17, wherein the first set of I/O signals are communicated between a processor of the safety trip device and field devices via a first set of termination modules carried by the housing of the safety trip device, the first set of termination modules including different types of termination modules corresponding to the first subset of the different types of I/O signals.

19. The method of claim 18, wherein ones of the first set of termination modules are selectively replaceable within the housing by ones of a second set of termination modules, the second set of termination modules including different types of termination modules corresponding to the second subset of the different types of I/O signals.

20. The method of claim 15, wherein the plurality of available safety applications includes a first set of applications stored in the memory and a second set of applications available for download.

21. The method of claim 15, wherein ones of the plurality of available safety applications are certified by a safety compliance authority prior to being provided to the user for selection.

* * * * *